UNITED STATES PATENT OFFICE.

HARRY C. HUBBELL, OF NEWARK, NEW JERSEY.

METHOD OF MAKING STORAGE-BATTERY ELECTRODES.

1,079,346.  Specification of Letters Patent.  Patented Nov. 25, 1913.

No Drawing.  Application filed November 23, 1910. Serial No. 593,760.

*To all whom it may concern:*

Be it known that I, HARRY C. HUBBELL, a citizen of the United States, residing at Newark, in the county of Essex and State of New Jersey, have invented certain new and useful Improvements in a Method of Making Storage-Battery Electrodes, of which the following is a specification.

My present invention relates to an improved storage battery electrode, that specifically described being especially adapted for use in batteries with unchanging alkaline electrolyte, and further relates to a method of making same. The electrode in its make-up comprises elongated members, each of which consists of elongated portions attached together side by side, one portion being active material and the other being a metal.

The other features of this new electrode and its advantages will appear from an understanding of the following specification, wherein I have described and claimed one general method, now known to me, of making the electrode, but it will be understood that this is not necessarily the only method. Further, in the following description of the process, I refer specifically to nickel and cobalt, but this is not to be taken as limiting the electrode and the process to these metals only. Thus, all of the metals and their compounds, for example, nickel, cobalt, iron, cadmium, and their active oxygen compounds, etc., that are suitable for use in connection with storage battery electrodes, are, in general, capable of use in my new electrode.

Proceeding now with the description of a specific instance of the process of making the new electrode where nickel or such corresponding metal as cobalt is used, I prefer to mix together enough of the finely divided metallic nickel or cobalt, or both, with the hydroxid of nickel or cobalt, or both, to make the mixture a good conductor.

I prefer to obtain the finely divided metallic nickel or cobalt in a novel manner. Thus, I take a solution of the metals, such as the chlorid of nickel or cobalt, and electrolyze it in a vessel containing a quantity of mercury in its bottom and further containing suspended therein an anode of nickel or cobalt. The effect of the electrolysis is that the nickel or cobalt is deposited on the mercury and seems to amalgamate therewith. The electrolysis having proceeded, the finely divided nickel or cobalt is obtained by removing the excess of mercury from the amalgam by pressure and by distilling off the remainder in a retort under proper regulation of temperature. This leaves a friable mass of nickel or cobalt which is easily reduced to a powder in a suitable mill. In fact an ordinary mortar and pestle may be used for small quantities. As already stated, if enough of this finely divided metallic nickel or cobalt is intimately mixed with their hydroxids, it will make the mixture a good electrical conductor. This mixture when wet is deposited in any suitable manner in rows on a plate, preferably consisting of non-conducting material inlaid with narrow conducting strips, the material being deposited on said strips. Preferably, after drying, the plate holding these elongated portions of material is immersed in a nickel or cobalt plating solution and metallic nickel or cobalt is deposited on the exposed surfaces of the material. In the plating operation, there will be a suitable plating solution of nickel or cobalt and a nickel or cobalt anode, whereas the material on the conducting strips of the plate will be the cathode.

It will be understood that the elongated portions of active material will be coated with metal only on their upper sides which are not in contact with the plate. Indeed, when a plate of the form described is used to support the rows of material, the metal will be deposited on each portion in the form of an elongated trough, the open side of the trough being where the material contacts with the plate. The result is that a filament or thread is produced which may be described as consisting of an elongated portion of active material provided with a metallic trough-like coating. These threads, filaments, fibers or ribbons are then removed from the plate and massed together and compressed to produce a cake which is then surrounded by a suitable conducting envelop.

The result of the fact that the metallic coating of the individual filaments covers the active material only on one side, as distinguished from completely surrounding it, is that the active material is thereby made perfectly accessible to the electrolytic action when the electrode made out of the filaments is actually used in the storage battery. Under this electrolytic action, the finely divided nickel and cobalt become converted into their respective hydroxids. Furthermore, it will be apparent that a filament composed entirely of finely divided nickel or cobalt with a coating of nickel or cobalt deposited on one side thereof, may be used because said finely divided metals may be subsequently oxidized in the storage battery using a plurality of such filaments for an electrode. Again, the filaments of active material formed in some such way as described preparatory to being coated on one side with the metal, may consist entirely of the oxygen or hydroxid compounds of the given metal or metals, provided these are sufficiently conductive. Finally, carbon or graphite may be mixed with these compounds to give them sufficient conductivity for the metallic coating process. However, this is not to be recommended since the carbon or graphite, after it has performed its office of making the material a conductor, is useless in the material because it is inactive and is not subject to oxidization and reduction to store and give forth energy in the storage battery, whereas the finely divided metals and their oxygen derivatives are at all times useful active materials. The resulting electrode has unusually high capacity and conductivity; in short, is very efficient.

In the claims which specify nickel, the expression "nickel active material" is intended to include either finely divided metallic nickel or oxygen compounds of nickel such as hydroxid or oxid or a mixture of both. It further includes such an equivalent of nickel as cobalt in any of the aforesaid forms, whether alone or admixed with nickel.

Having thus described my invention, what I claim is:

1. The process of making a storage battery electrode consisting in coating with metal one side of a filament shaped portion of active material and massing together a plurality of the resulting filaments.

2. The process of making a storage battery electrode consisting in electro-depositing a metal upon one side of a filament shaped portion of active material and massing together a plurality of the resulting filaments.

3. The process of making a storage battery electrode consisting in depositing a filament shaped portion of active material upon a conducting surface, and electro-depositing a metal upon the exposed portion of said active material, and massing together a plurality of the resulting filaments.

4. The process of making a storage battery electrode consisting in electro-depositing a metal upon one side of a filament shaped portion of active material containing finely divided metal to increase conductivity, and massing together a plurality of the resulting filaments.

5. The process of making a storage battery electrode consisting in depositing a filament shaped portion of active material containing finely divided metal upon a conducting surface, electro-depositing a metal upon the exposed portion of said active material, and massing together a plurality of the resulting filaments.

6. The process of making a storage battery electrode consisting in electro-depositing a metal upon one side of a filament shaped portion of active material containing a finely divided metal corresponding with the metal of the active material, and massing together a plurality of the resulting filaments.

7. The process of making a storage battery electrode consisting in electro-depositing nickel upon one side of a filament shaped portion of nickel active material, and massing together a plurality of the resulting filaments.

In testimony whereof I affix my signature in presence of two witnesses.

HARRY C. HUBBELL.

Witnesses:
  E. W. SCHERR, Jr.,
  EDNA A. MORELAND.